US010673486B2

(12) United States Patent
Yang et al.

(10) Patent No.: US 10,673,486 B2
(45) Date of Patent: Jun. 2, 2020

(54) DEVICE AND METHOD FOR CONTROLLING TRANSACTION BETWEEN SHORT-RANGE WIRELESS COMMUNICATION READER AND EXTERNAL ELECTRONIC DEVICE

(71) Applicant: Samsung Electronics Co., Ltd., Gyeonggi-do (KR)

(72) Inventors: Yi Yang, Gyeonggi-do (KR); Ji-Ho Shin, Seoul (KR); Moon-Seok Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/170,198

(22) Filed: Oct. 25, 2018

(65) Prior Publication Data

US 2019/0140697 A1   May 9, 2019

(30) Foreign Application Priority Data

Nov. 7, 2017  (KR) .......................... 10-2017-0147663

(51) Int. Cl.
*H04B 5/00* (2006.01)
*H04W 4/80* (2018.01)
(Continued)

(52) U.S. Cl.
CPC ......... *H04B 5/0031* (2013.01); *H04B 5/0056* (2013.01); *H04W 4/20* (2013.01);
(Continued)

(58) Field of Classification Search
CPC combination set(s) only.
See application file for complete search history.

(56) References Cited

U.S. PATENT DOCUMENTS 7,428,404 B2 *  9/2008  Kawaguchi ......... H04M 1/7253
455/11.1
9,473,233 B2 * 10/2016  Xie ....................... H04W 76/18
(Continued)

FOREIGN PATENT DOCUMENTS

KR   10-2016-0103354 A    9/2016
WO      2016/097462 A1    6/2016

OTHER PUBLICATIONS

International Search Report dated Jan. 28, 2019.

*Primary Examiner* — Nhan T Le
(74) *Attorney, Agent, or Firm* — Cha & Reiter, LLC.

(57) ABSTRACT

According to an embodiment, an electronic device, comprises a first communication circuit configured to support near-field communication (NFC); a second communication circuit configured to support wireless communication; at least one memory device; and at least one processor operationally connected with the first communication circuit, the second communication circuit, and the at least one memory device, wherein the at least one memory device stores instructions, when executed, cause the at least one processor to perform operations comprising: receive, from a first external electronic device via the first communication circuit, a first request for the first external electronic device to perform a transaction with a second external electronic device, in response to the first request: transmit the first request via the second communication circuit to the second external electronic device; and transmit a first response, corresponding to the first request, the first response including data stored in the at least one memory device, to the first external electronic device via the first communication circuit, and receive a second response corresponding to the first request from the second external electronic device via the
(Continued)

second communication circuit, the second response containing at least part of the first response.

9 Claims, 13 Drawing Sheets

(51) Int. Cl.
  *H04W 4/20* (2018.01)
  *H04W 52/02* (2009.01)
  *H04W 88/04* (2009.01)

(52) U.S. Cl.
  CPC ......... *H04W 4/80* (2018.02); *H04W 52/0229* (2013.01); *H04W 88/04* (2013.01)

(56) References Cited

U.S. PATENT DOCUMENTS

| | | | |
|---|---|---|---|
| 9,578,669 B2* | 2/2017 | Kim | H04W 76/14 |
| 9,913,077 B2* | 3/2018 | Klabunde | H04B 5/0012 |
| 2014/0058935 A1 | 2/2014 | Mijares | |
| 2014/0180923 A1 | 6/2014 | Choi | |
| 2015/0359001 A1* | 12/2015 | Li | H04W 72/0453 |
| | | | 370/346 |
| 2016/0247057 A1 | 8/2016 | Lee et al. | |
| 2016/0283934 A1 | 9/2016 | Cheng et al. | |
| 2017/0013457 A1 | 1/2017 | Polak et al. | |
| 2018/0081650 A1 | 3/2018 | Larin et al. | |

* cited by examiner

DEVICE AND METHOD FOR CONTROLLING TRANSACTION BETWEEN SHORT-RANGE WIRELESS COMMUNICATION READER AND EXTERNAL ELECTRONIC DEVICE

CROSS-REFERENCE TO RELATED APPLICATION(S)

This application is based on and claims priority under 35 U.S.C. § 119 to Korean Patent Application No. 10-2017-0147663, filed on Nov. 7, 2017, in the Korean Intellectual Property Office, the disclosure of which is incorporated by reference herein in its entirety.

BACKGROUND

1. Field

Various embodiments of the disclosure relate to devices and methods for controlling transactions between a short-range wireless communication reader and an external electronic device.

2. Description of Related Art

Electronic devices may wirelessly interwork with external electronic devices to provide various functions. For example, wearable electronic devices may wirelessly receive text messages received by mobile electronic devices and provide notifications. As various functions of a mobile electronic device may be provided through a wearable electronic device, user convenience may increase.

In certain cases, electronic devices may use various schemes of making payments to external electronic devices. It is important the signals for making payments be reliable.

The above information is presented as background information only to assist with an understanding of the disclosure. No determination has been made, and no assertion is made, as to whether any of the above might be applicable as prior art with regard to the disclosure.

SUMMARY

An external electronic device, e.g., a mobile electronic device, may provide various services, such as contactless payment or employee ID authentication, via an electronic device, e.g., a wearable electronic device, using short-range wireless communication, e.g., near-field communication (NFC). For example, the wearable electronic device may perform data communication with an NFC reader and may then perform data communication with the mobile electronic device, thereby allowing for mobile payment to be made between the NFC reader and the mobile electronic device. When the mobile electronic device performs data communication with the NFC reader through the wearable electronic device, an additional communication process between the mobile electronic device and the wearable electronic device is required, and this may cause a time delay compared to direct communication between the mobile electronic device and the NFC reader. When the NFC reader fails to receive a response from the mobile electronic device within a predetermined time as a result of time delay, payment between the NFC reader and the mobile electronic device may not be allowed. Alternatively, although mobile payment is allowed, the time delay still inconveniences the user.

According to an embodiment, a mobile electronic device may quickly perform data communication with an NFC reader through a wearable electronic device.

According to an embodiment, a wearable electronic device may control a mobile electronic device to perform a transaction with an NFC reader based on data obtained by a provisioning process that applies a cached method learned by another electronic device.

According to an embodiment, an electronic device may comprise a first communication circuit configured to support near-field communication (NFC), a second communication circuit configured to support wireless communication, at least one memory device, and at least one processor operationally connected with the first communication circuit, the second communication circuit, and the at least one memory device, wherein the at least one memory device may store instructions, when executed, configured to enable the at least one processor to receive, from a first external electronic device via the first communication circuit, a first request for the first external electronic device to perform a transaction with a second external electronic device, in response to the first request, to transmit the first request via the second communication circuit to the second external electronic device and transmit a first response, corresponding to the first request, among data stored in the at least one memory device, to the first external electronic device via the first communication circuit, and to receive a second response that corresponds to the first request and that contains at least part of the first response from the second external electronic device via the second communication circuit.

According to an embodiment, an electronic device, comprises a communication circuit; at least one memory device; and at least one processor operatively coupled with the communication circuit and the at least one memory device, wherein the at least one memory device stores instructions, when executed, cause the at least one processor to perform operations comprising: launch an application configured to control a transaction with a first external electronic device via a second external electronic device connected with the electronic device and using the communication circuit, gather log data for the transaction of the application, and produce first data associated with the application based on a difference between prior log data for a prior transaction of the application and the gathered log data.

According to an embodiment, there may be provided a non-transitory computer-readable recording medium storing instructions configured to perform at least one operation by at least one processor, the at least one operation comprising of establishing, by the at least one processor, a wireless communication channel with a second external electronic device, receiving, by the second external electronic device, first data about an application configured to perform a transaction between the second external electronic device and a first external electronic device from a server, controlling the transaction between the second external electronic device and the first external electronic device based on the first data, after the transaction is complete, receiving update information for the first data from the second external electronic device through the wireless communication channel, and updating the first data based on the received update information.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
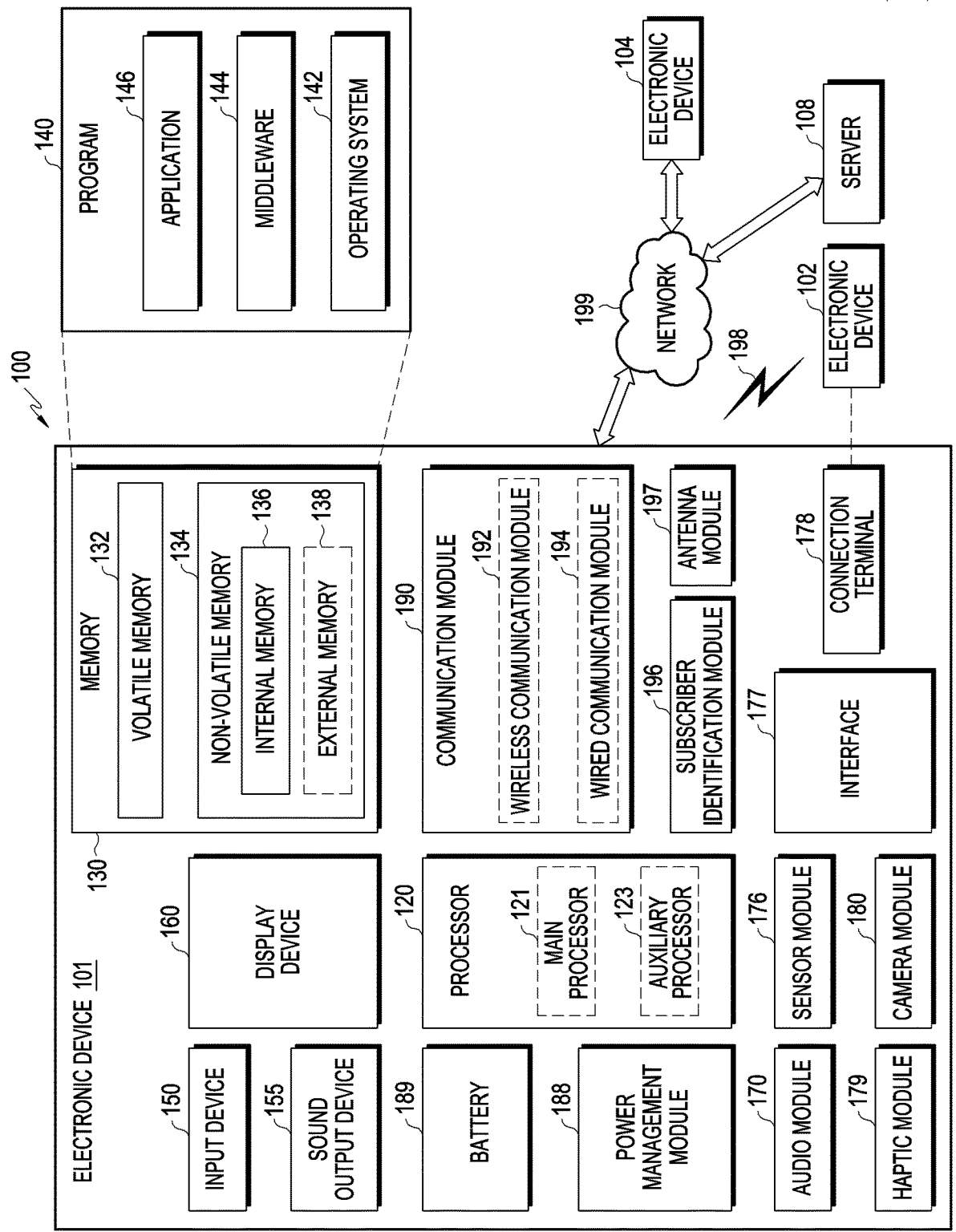
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory device 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory device 132, and the processor 120 may store resultant data in a non-volatile memory device 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory device 130 may store various data used by at least one component (e.g., the processor 120) of the electronic device 101, e.g., software (e.g., the program 140) and input data or output data for a command related to the software. The memory device 130 may include the volatile memory device 132 or the non-volatile memory device 134.

The program 140, as software stored in the memory device 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips. The foregoing communication modules 190, 192, may include transceivers.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment, an electronic device (e.g., the electronic device 101 of FIG. 1) may comprise a first communication circuit configured to support near-field communication (NFC) (such as forming a first portion of the wireless communication module 192), a second communication circuit configured to support wireless communication (such as forming a second portion of the wireless communication module), at least one memory device (such as memory 130), and at least one processor (e.g., processor 120) operationally connected with the first communication circuit, the second communication circuit, and the at least one memory device. The at least one memory device may store instructions, when executed, cause the at least one processor to receive, from a first external electronic device (such as electronic device 102) via the first communication circuit, a first request for the first external electronic device to perform a transaction with a second external electronic device, such as a Point of Sale NFC reader. In response to the first request, the second communication circuit transmits the first request to the second external electronic device and the first communication circuit transmits a first response, corresponding to the first request, among data stored in the at least one memory device, to the first external electronic device. The second communication circuit receives a second response that corresponds to the first request and that contains at least part of the first response from the second external electronic device.

According to an embodiment, the at least one processor (e.g., the processor 120 of FIG. 1) of the electronic device (e.g., the electronic device 101 of FIG. 1) may modify at least part of the first response based on the data stored in the at least one memory device (memory 130) and may transmit the modified first response to the first external electronic device (e.g., electronic device 102).

According to an embodiment, the at least one processor (e.g., the processor 120 of FIG. 1) of the electronic device (e.g., the electronic device 101 of FIG. 1) may transmit a second request to the second external electronic device via the second communication circuit (which can form the second portion of wireless communication module 192), based on the data stored in the at least one memory device (memory 130), after transmitting the second request, receive a third request including at least part of the second request and, corresponding to the first response from the first external electronic device (one of electronic devices 192) via the first communication circuit (forming a portion of wireless communication module 192), receive a third response corresponding to the second request from the second external electronic device (another of electronic devices 102) via the second communication circuit (forming a portion of wireless communication module 192), and transmit the third response to the first external electronic device via the first communication circuit.

According to an embodiment, the at least one processor (e.g., the processor 120 of FIG. 1) of the electronic device (e.g., the electronic device 101 of FIG. 1) may, in response to an event detected by the first communication circuit, transmit a wakeup signal to the second external electronic device (another of electronic devices 102) via the second communication circuit.

According to an embodiment, the at least one processor (e.g., the processor 120 of FIG. 1) of the electronic device (e.g., the electronic device 101 of FIG. 1) may, upon receiving a signal from the first external electronic device or upon detecting an input associated with the transaction through a user interface, determine that an event for the first communication circuit has occurred.

According to an embodiment, the at least one processor (e.g., the processor 120 of FIG. 1) of the electronic device (e.g., the electronic device 101 of FIG. 1) may produce a radio frequency (RF) parameter including information regarding at least one of the following: whether a protocol parameter selection (PPS) is supported, whether a card identifier (CID) is supported, or a startup frame guard time integer (SFGI) and may update the first communication circuit with the RF parameter.

According to an embodiment, the at least one processor (e.g., the processor 120 of FIG. 1) of the electronic device (e.g., the electronic device 101 of FIG. 1) may initialize the RF parameter not to support the PPS, not to support the CID, and to set the SFGI to 0.

According to an embodiment, the at least one processor (e.g., the processor 120 of FIG. 1) of the electronic device (e.g., the electronic device 101 of FIG. 1) may transmit the first response to the first external electronic device within a predetermined reception time of the first request.

According to an embodiment, the data stored in the at least one memory device may include data received from a server via the second communication circuit.

According to an embodiment, an electronic device (e.g., the electronic device 101 of FIG. 1) may comprise a communication circuit, at least one memory device, and at least one processor operationally connected with the communication circuit and the at least one memory device, wherein the at least one memory device may store instructions, when executed, configured to enable the at least one processor to launch an application configured to control a transaction with a first external electronic device via a second external electronic device connected with the electronic device and using the communication circuit, to gather log data for the transaction of the application, and to produce first data associated with the application based on the difference between prior log data for a prior transaction of the application and the gathered log data.

According to an embodiment, the first data may include a plurality of application protocol data units (APDUs) for the electronic device in order to perform the transaction with the first external electronic device.

According to an embodiment, the processor (e.g., the processor 120 of FIG. 1) of the electronic device (e.g., the electronic device 101 of FIG. 1) may store at least one APDU, for which a value of the prior log data is the same as a value of the log data, among the plurality of APDUs, as a constant value in the first data.

According to an embodiment, the processor (e.g., the processor 120 of FIG. 1) of the electronic device (e.g., the electronic device 101 of FIG. 1) may store, in the first data, at least one APDU among the plurality of APDUs, as a variable value determined by at least one of the identification information of the electronic device, the identification information of the second external electronic device, and the number of transactions between the electronic device and the first external electronic device.

According to an embodiment, the processor (e.g., the processor 120 of FIG. 1) of the electronic device (e.g., the electronic device 101 of FIG. 1) may upload information about the application and the first data onto a server via the communication circuit.

According to an embodiment, the processor (e.g., the processor 120 of FIG. 1) of the electronic device (e.g., the electronic device 101 of FIG. 1) may send a request for data associated with the application to a server via the communication circuit and download second data from the server. The prior log data may include at least part of the second data.

According to an embodiment, the processor (e.g., the processor 120 of FIG. 1) of the electronic device (e.g., the electronic device 101 of FIG. 1) may transmit information about the application and the first data to the second external electronic device via the communication circuit.

Figure 2:
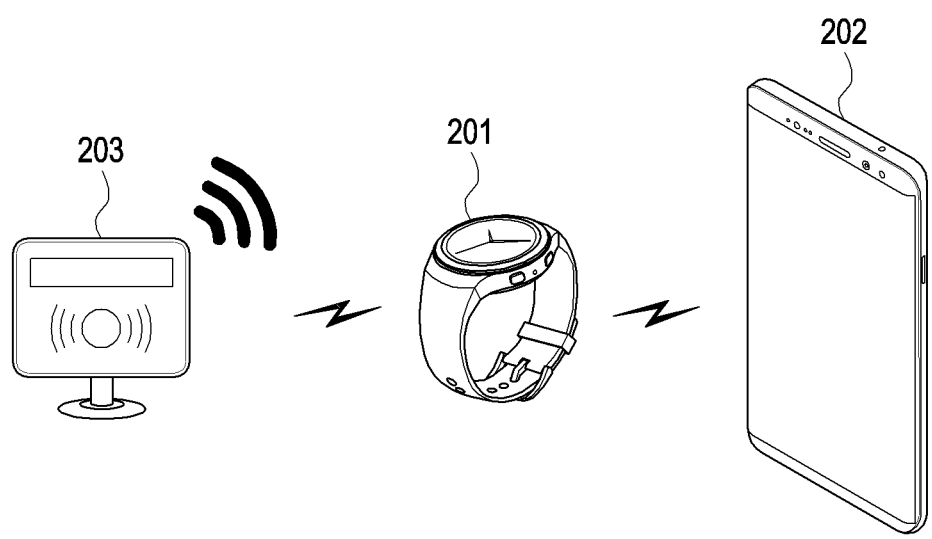
FIG. 2 is a view illustrating an example of a circumstance where an electronic device controls transactions of other electronic devices according to an embodiment.

FIG. 2 is a view illustrating a configuration where an electronic device controls transactions of other electronic devices according to an embodiment. According to an embodiment, an electronic device 201 (e.g., the electronic device 101 of FIG. 1) may control a transaction between a first external electronic device 203 (e.g., the electronic device 101 of FIG. 1) and a second external electronic device 202 (e.g., the electronic device 102 of FIG. 1) wirelessly connected to the electronic device 201.

For example, the electronic device 201 may be a wearable electronic device, the first external electronic device 203 may be an NFC reader or include an NFC reader, and the second external electronic device 202 may be a mobile electronic device. According to an embodiment, the wearable electronic device 201 may control the transaction between the mobile electronic device 202 and the NFC reader 203. In certain embodiments, the electronic device 201 may comprise an electronic device dimensions less than 7.5 cm/3 in and a thickness less than 1 cm/0.4 in. In certain embodiments, the mobile electronic device 202 can have a size of at least 5 cm/2 in×12.5 cm/5 in. In certain embodiments, the first external device 203 may be fastened to a particular location and may include a credit card chip reader or swipe. The wearable electronic device 201 may be wirelessly connected to the mobile electronic device 202 via wireless communication. According to an embodiment, the wearable electronic device 201 may be connected to the mobile electronic device 202 via Bluetooth™ wireless communication. According to another embodiment, the wearable electronic device 201 may be connected to the mobile electronic device 202 via wireless-fidelity (Wi-Fi) direct, cellular communication, or other various wireless communication schemes or standards. The wearable electronic device 201 may perform data communication with the NFC reader 203 via near-field communication (NFC). For example, the wearable electronic device 201 may include a chip that is read (now referred to as "tagged") by the NFC reader 203 to perform contactless communication with the NFC reader 203.

For example, when the NFC reader 203 is a point-of-sale (POS) device, when the wearable electronic device 201 is tagged onto the NFC reader 203, the wearable electronic device 201 may receive a request for mobile payment from the NFC reader 203. In response, the wearable electronic device 201, may transmit the received request to the mobile electronic device 202 using another communication scheme. The wearable electronic device 201 can receive a response to the request from the mobile electronic device 202, and transmit the received response to the NFC reader 203, thereby acting as an agent for the transaction between the NFC reader 203 and the mobile electronic device 202.

The mobile electronic device 202 may include payment information for mobile payments for the NFC reader 203. If the mobile electronic device 202 was previously connected with the wearable electronic device 201 via wireless communication, mobile electronic device 202 may enable mobile payment for the NFC reader 203 via the wearable electronic device 201. This allows the user the convenience of using the user convenience.

According to an embodiment, user A may use the mobile electronic device 202 and the wearable electronic device 201. User A may connect the wearable electronic device 201 to the mobile electronic device 202 beforehand via wireless communication. For example, the wearable electronic device 201 may be a wrist wearable electronic device 201, and the NFC reader 203 may be an NFC reader for employee identity (ID) authentication. To authenticate user A's ID and pass through the gate of the company, user A may bring the wearable electronic device 201, worn on A's wrist, close (within 4 cm/1.57 in) to the NFC reader 203 with the mobile electronic device 202 in a bag. User A may set the mobile electronic device 202 beforehand to allow an application for employee ID authentication (hereinafter the application is referred to as an "NFC relay communication application") to perform a transaction with the NFC reader 203 via the wearable electronic device 201. When user A runs the NFC relay communication application on the wearable electronic device 201, the wearable electronic device 201 may display an NFC relay communication application list that may include the application for employee ID authentication which has been set by user A.

As another example, the mobile electronic device 202 may include an electronic credit card (e-credit card) of the user of the mobile electronic device 202 in an embedded secure element (eSE). The mobile electronic device 202 may make a credit card payment via the credit card embedded in the eSE. For example, the wearable electronic device 201 may be a wrist wearable electronic device 201, and the NFC reader 203 may be a store Point of Sale. For example, user A may set an application for mobile payment using the credit card embedded in the eSE in the mobile electronic device 202 beforehand as a relay communication application to perform transaction with the Point of Sale device via the wearable electronic device 201. When user A runs the NFC relay communication application on the wearable electronic device 201, the wearable electronic device 201 may display an NFC relay communication application list that may include the application for mobile payment using a credit card which has been set by user A.

Figure 3:
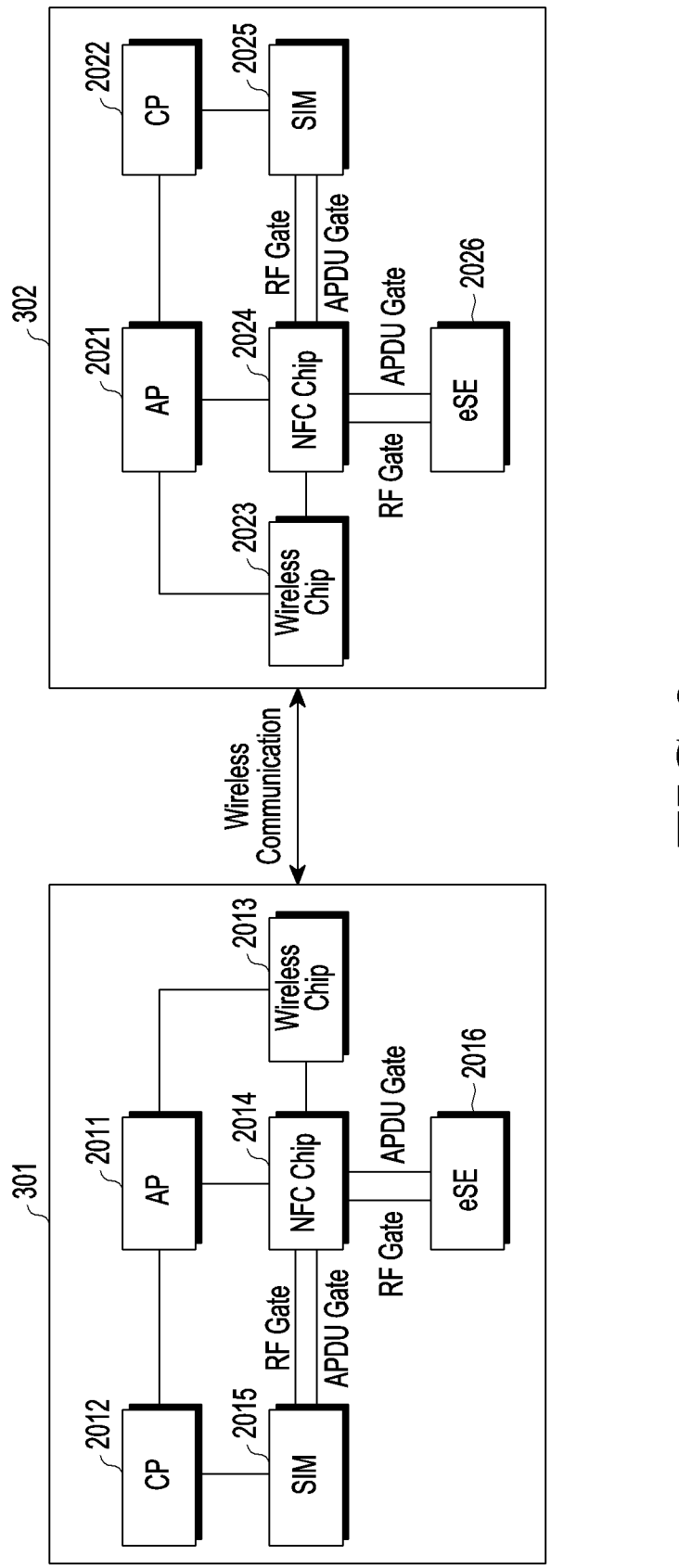
FIG. 3 is a block diagram illustrating an electronic device and an external electronic device according to an embodiment.

FIG. 3 is a block diagram illustrating an electronic device and an external electronic device according to an embodiment.

According to an embodiment, an electronic device 301 (e.g., the electronic device 101 of FIG. 1) may be wirelessly connected with an external electronic device 202 (e.g., the electronic device 102 or the electronic device 104 of FIG. 1). For example, the electronic device 301 may be a wearable electronic device (e.g., the wearable electronic device 201 of FIG. 2), and the external electronic device 302 connected via wireless communication may be a mobile electronic device (e.g., the mobile electronic device 202 of FIG. 2).

The electronic device 301 may include an application processor (AP) 2011 (e.g., the processor 120 of FIG. 1), a communication processor (CP) 2012 (e.g., the processor 120 of FIG. 1), a wireless chip 2013 (e.g., the communication module 190 of FIG. 1), and an NFC chip 2014 (e.g., the communication module 190 of FIG. 1). According to an embodiment, the electronic device 301 may further include a subscriber identification module (SIM) 2015 and an eSE 2016.

The application processor 2011 may run an operating system (OS) of the electronic device 301 and an NFC-related process based on the OS and a host card emulation (HCE) application. The HCE application may communicate payment-related data with an NFC reader. The HCE application may be implemented based on the OS of the electronic device 301. For example, the HCE application may be implemented to differ on an Android electronic device and a Windows electronic device.

The communication processor 2012 may receive data from the application processor 2011, transmit the data to the SIM 2015, or may receive data from the SIM 2015 and transmit the data to the application processor 2011, thereby controlling communication between the application processor 2011 and the SIM 2015.

The wireless chip 2013 may include a circuit to support remote wireless communication or short-range wireless communication. For example, the wireless chip 2013 may transceiver configured for remote wireless communication, such as cellular communication or wireless internet, and short-range wireless communication, such as Wi-Fi direct or bluetooth.

The NFC chip 2014 may include a circuit to support contactless short-range wireless communication and may exchange data by being tagged onto another electronic device supporting NFC. The NFC chip 2014 may receive data required for payment from the NFC reader (e.g., a Point of Sale device), determine which one of the application processor 2011, the eSE 2016, and the SIM 2015 to transmit the received data to, and may transmit the received data to the payment-related application, the application that is running a payment-related applet, the eSE 2016, or the SIM 2015. The NFC chip 2014 may receive data from the payment-related application or payment-related application and transfer the received data to the NFC reader. The NFC chip 2014 may provide a logical connection between the radio frequency (RF) gate and the application protocol data unit (APDU) gate. The RF gate may enable data communication between the NFC chip 2014 and the eSE 2016 and data communication between the NFC chip 2014 and the SIM 2015. For example, the NFC chip 2014 may transfer data received from the NFC reader to the eSE 2016 or the SIM 2015 via the RF gate, thereby supporting contactless communication with the NFC reader. The APDU gate enables data communication with another host (e.g., the application processor 2011 or eSE 2016). For example, the NFC chip 2014 may support data communication between the application processor 2011 and the eSE 2016 or data communication between the application processor 2011 and the SIM 2015.

The SIM 2015 may include at least one or more applets to process payments. The SIM 2015 may be connected with the NFC chip 2014 and may be an integrated circuit (IC) chip where a subscriber identification module is implemented. For example, the SIM 2015 may generate or authenticate data required for making payments using subscriber identification information.

The eSE 2016, which stands for embedded secure element, may include at least one or more applets to process payments. The eSE 2016 may be connected with the NFC chip 2014 and generate or authenticate security-related data.

The applets may be stored in the SIM 2015 or the eSE 2016, which is a secure element, and may communicate payment data with the NFC reader. Each applet may be identified by the application identity (AID).

The external electronic device 302 may include an application processor 2021 (e.g., the application processor 2011), a communication processor 2022 (e.g., the communication processor 2012), a wireless chip 2023 (e.g., the wireless chip 2013), an NFC chip 2024 (e.g., the NFC chip 2014), a SIM 2025 (e.g., the SIM 2015), and an eSE 2026 (e.g., the eSE 2016).

The electronic device 301 may establish a wireless communication channel with the external electronic device 302 via the wireless chip 2013 of the electronic device 301 and the wireless chip 2023 of the external electronic device 302.

According to an embodiment, the electronic device 301 may receive a first request for a first external electronic device to perform a transaction with a second external electronic device 302 from the first external electronic device (e.g., the NFC reader 203 of FIG. 2) using a first communication circuit (e.g., the NFC chip 2014). In response to the first request, the electronic device 301 may transmit the first request to the second external electronic device 302 via a second communication circuit (e.g., the wireless chip 2013) and may transmit a first response corresponding to the first request among data stored in at least one memory device (e.g., the memory device 130 of FIG. 1) to the first external electronic device via the first communication circuit (e.g., the NFC chip 2014).

According to an embodiment, after transmitting the first request to the second external electronic device 302, the electronic device 301 may transmit the first response to the first external electronic device. Or, after transmitting the first response to the first external electronic device, the electronic device 301 may transmit the first request to the second external electronic device 302. The electronic device 301 may receive a second response, which corresponds to the first request and includes at least part of the first response, from the second external electronic device 302 via the second communication circuit (e.g., the wireless chip 2013).

According to an embodiment, the electronic device 301 may transmit the first response to the first external electronic device within a predetermined time from the receipt of the first request. According to an embodiment, the first external electronic device may include information about the predetermined time in the first request and transmit the first request to the electronic device 301. The predetermined time, such as one to validate the transaction between the first external electronic device and the second external electronic device, may be set beforehand. For example, the predetermined time may be a startup frame guard time (SFGT) that may indicate a particular guard time required for the Proximity Integrated Circuit Card (PICC) to be ready to receive the next frame after sending out the ATS. The startup frame guard time integer (SFGI) used to define the SFGT may be determined to be a value ranging from 0 to 14.

According to an embodiment, the electronic device 301 may modify at least part of the first response based on data stored in the at least one memory device and transmit the modified first response to the first external electronic device.

According to an embodiment, the electronic device 301 may transmit a second request to the second external electronic device 302 using the second communication circuit and based on the data stored in the at least one memory device. The electronic device 301, after transmitting the second request, may receive a third request, which corresponds to the first response and contains at least part of the second request, from the first external electronic device via the first communication circuit. The electronic device 301 may receive a third response corresponding to the second request from the second external electronic device 302 via the second communication circuit. The electronic device 301 may transmit the received third response via the first communication circuit to the first external electronic device.

According to an embodiment, the electronic device 301 may transmit the third response to the first external electronic device within a predetermined receipt time of the third request.

According to an embodiment, in response to an event detected by the first communication circuit, the electronic device 301 may transmit a wakeup signal to the second external electronic device 302 via the second communication circuit. According to an embodiment, upon receiving a signal from the first external electronic device or detecting an input associated with the transaction between the first external electronic device and the second external electronic device via the user interface, the electronic device 301 may determine that the event for the first communication circuit occurs.

According to an embodiment, the electronic device 301 may produce an RF parameter containing at least one of the following: whether the protocol parameter selection (PPS) is supported, whether the card identity (CID) is supported, or the SFGI. The electronic device 301 may transmit the produced RF parameter to the first communication circuit (e.g., the NFC chip 2014). According to an embodiment, the electronic device 301 may initialize the RF parameter to create a setting not to support the PPS and the CID and to set the SFGI to 0.

According to an embodiment, the data stored in the at least one memory device may include data that is received from a server (not shown) (e.g., the server 108 of FIG. 1) via the second communication circuit (e.g., the wireless chip 2013).

According to an embodiment, the external electronic device 302 may launch or run an application for a transaction with the first external electronic device (not shown) (e.g., the NFC reader 203 of FIG. 2) via the electronic device 301 connected to the external electronic device 302 via the communication circuit (e.g., the wireless chip 2023). The external electronic device 302 may gather log data about the transaction of the application. The external electronic device 302 may produce first data associated with the application based on a difference between prior log data about a prior transaction of the application and the log data.

According to an embodiment, the first data may include a plurality of APDUs for the electronic device 301 in order to perform a transaction with the first external electronic device.

According to an embodiment, the external electronic device 302 may store at least one APDU, for which the value of the prior log data is the same as the value of the gathered log data, among the plurality of APDUs, as a constant, in the first data.

According to an embodiment, the external electronic device 302 may store, in the first data, at least one of the plurality of APDUs, as a variable determined by at least one of the number of times in which the external electronic device 302 has made transactions with the first external electronic device, identification information about the electronic device 301, or identification information about the external electronic device 202.

According to an embodiment, the external electronic device 302 may upload the application information and the first data onto the server (not shown) (e.g., the server 108 of FIG. 1) via the communication circuit (e.g., the wireless communication circuit 2023).

According to an embodiment, the external electronic device 302 may send a request for the application-associated data to the server (not shown) (e.g., the server 108 of FIG. 1) via the communication circuit (e.g., the wireless communication circuit 2023) and download second data from the server. The prior log data may include at least part of the second data.

According to an embodiment, the external electronic device 302 may transmit the application information and the first data to the electronic device 301 via the communication circuit (e.g., the wireless communication circuit 2023).

Figure 4:
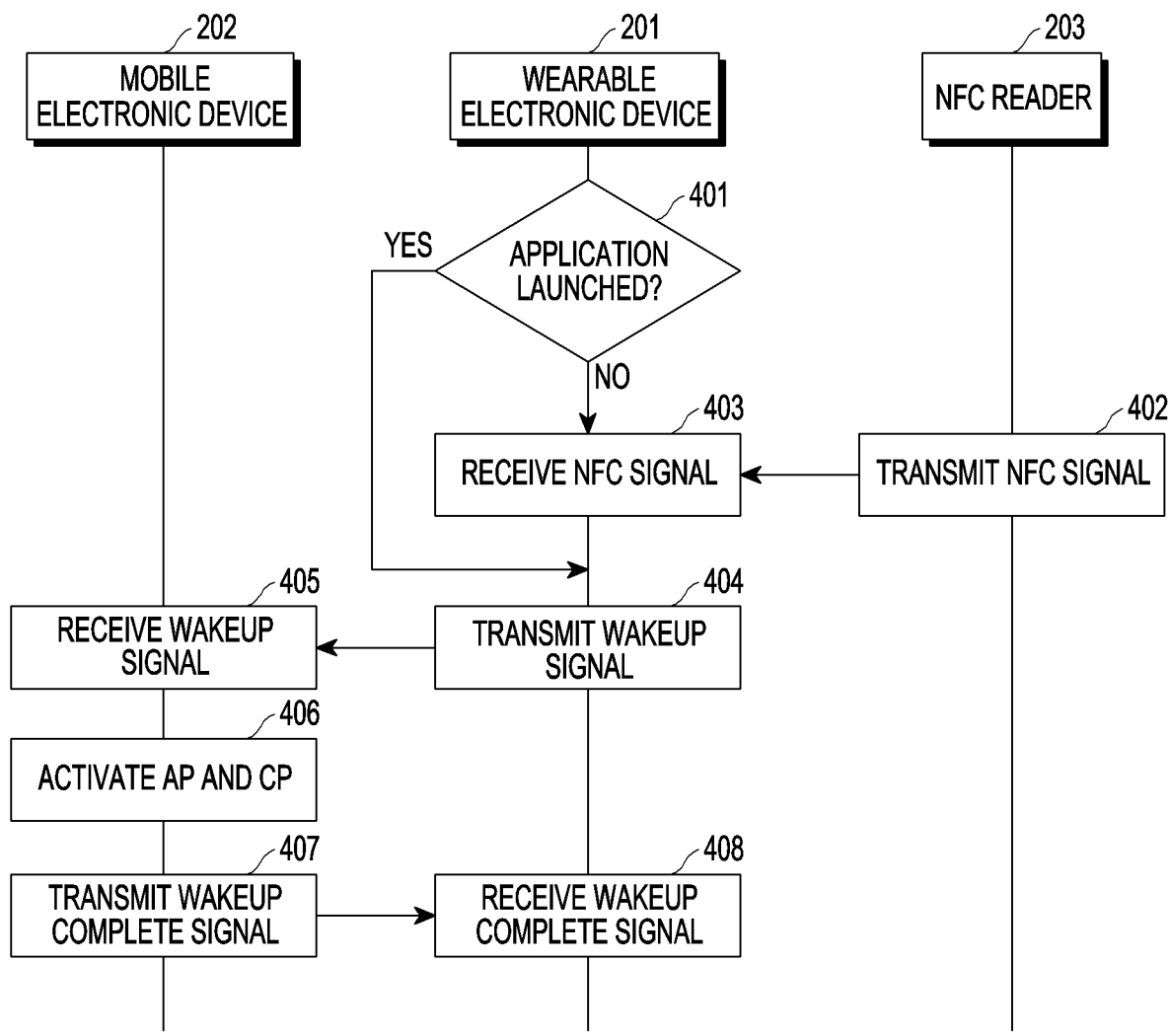
FIG. 4 is a sequence diagram illustrating a method for activating, by an electronic device, at least one processor of another electronic device according to an embodiment.

FIG. 4 is a signal flow diagram for activating, by an electronic device, at least one processor of another electronic device according to an embodiment. An electronic device (e.g., the electronic device 101 of FIG. 1) may be the wearable electronic device 201, and another electronic device (e.g., the electronic device 102 or 104 of FIG. 1) may be the mobile electronic device 202. To control transactions between the mobile electronic device 202 and the NFC reader 203, the wearable electronic device 201 may previously activate at least one processor (e.g., the AP 2021 or CP 2022 of FIG. 3) of the mobile electronic device 202.

In operation 401, the wearable electronic device 201 may detect an execution of the application for controlling transactions between the mobile electronic device 202 and the NFC reader 203. For example, when the wearable electronic device 201 receives a user input for an application related to fare payment via a user interface via a touch screen, the wearable electronic device 201 may determine that the HCE application has been executed to pay for a fare via the NFC reader 203. The wearable electronic device 201, upon detecting the execution of the application, may perform an operation 404, transmitting a wakeup signal to the mobile electronic device 202.

Alternatively, at operation 402, the NFC reader 203 may transmit the NFC signal to the wearable electronic device 201. Accordingly, the wearable electronic device 201 may receive an NFC signal from the NFC reader 203 in operation 403. For example, when the wearable electronic device 201 approaches and tags onto the NFC reader 203, the wearable electronic device 201 may produce an EVT_FIELD_ON/EVT_FIELD_OFF signal in the NFC chip. To use the RF parameter updated in the NFC chip to perform a transaction with the NFC reader 203, the wearable electronic device 201 may connect according to the ISO 14443-4 protocol (as set forth in ISO/IEC 14443-4:2016 Part 4: Transmission Protocol, which is hereby incorporated by reference) and produce an EVT_CARD_ACTIVATED signal in the NFC chip.

In operation 404, the wearable electronic device 201 may transmit a wakeup signal to the mobile electronic device 202 via wireless communication. According to an embodiment, the wireless communication may be short-range wireless communication or remote wireless communication. For example, the wireless communication may be a bluetooth network. According to an embodiment, the wearable electronic device 201 may be connected with the mobile electronic device 202 beforehand via wireless communication. According to an embodiment, the wakeup signal may include at least one of an NFC field activation event, information about the application of the wearable electronic device 201 (e.g., application version information), identification information about the wearable electronic device 201 (e.g., the unique number (e.g., serial number) of the wearable electronic device 201), and/or information about a next transaction (e.g., the session key value for the next transaction).

In operation 405, the mobile electronic device 202 may receive the wakeup signal, such as an interrupt. According to an embodiment, the mobile electronic device 202 may be in a sleep mode or a sniff mode. For example, when the mobile electronic device 202 takes no action to reduce power consumption, the application processor may enter sleep mode, and when no wireless communication-related action is taken, the communication processor may enter sniff mode.

In operation 406, the mobile electronic device 202 may first activate at least one of the application processor and the communication processor using, as a trigger or interrupt, the wakeup signal transmitted from the wearable electronic device 201, before performing a transaction with the NFC reader 203.

In operation 407, the mobile electronic device 202 may transmit a wakeup complete signal to the wearable electronic device 201. For example, the mobile electronic device 202 may notify the wearable electronic device 201 that its wakeup has been completed through wireless communication. In operation 408, the wearable electronic device 201 may receive the wakeup complete signal.

Figure 5:
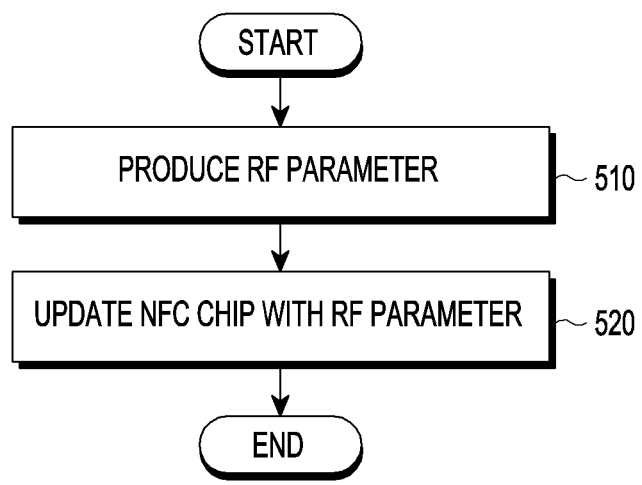
FIG. 5 is a flowchart illustrating a method for generating, by an electronic device, an RF parameter according to an embodiment.

FIG. 5 is a flowchart illustrating a method for generating, by an electronic device, an RF parameter according to an embodiment. According to an embodiment, an electronic device (e.g., the electronic device 101 of FIG. 1) may be a wearable electronic device (e.g., the electronic device 201 of FIG. 2 or the electronic device 201 of FIG. 3).

The wearable electronic device 201 may control transactions between a mobile electronic device (e.g., the second external electronic device 202 of FIG. 2) interworking with the wearable electronic device 201 and an NFC reader (e.g., the first external electronic device 203 of FIG. 2). One way that the wearable electronic device 201 may control transactions between a mobile electronic device 202 and an NFC reader 203 is by producing a radio frequency (RF) parameter.

FIG. 5 is a flow diagram of a method for producing, by the wearable electronic device 201, an RF parameter to quickly perform a transaction between the mobile electronic device 202 and the NFC reader 203, according to an embodiment. According to an embodiment, the mobile electronic device 202 may connect via the ISO 14443-4 protocol for transactions with the NFC reader 203. After connecting via the ISO 14443-4 protocol, the mobile electronic device 202 may generate data required for mobile payments as per the APDU format defined in ISO 7816 and transmit the generated APDU data to the NFC reader 203 or per-APDU format data from the NFC reader 203, thereby proceeding with a mobile payment. For the ISO 14443-4 protocol connection, the mobile electronic device 202 may communicate at least one or more instructions with the NFC reader 203. For example, the mobile electronic device 202 may transfer payment data received from the NFC reader 203 to an eSE (e.g., the eSE 2026 of the external electronic device 202 of FIG. 3), a SIM (e.g., the SIM 2025 of the external electronic device 202 of FIG. 3), or an AP (e.g., the AP 2021 of the external electronic device 202 of FIG. 3) via a routing module in the NFC chip (e.g., the NFC chip 2024 of the external electronic device 202 of FIG. 3). For the transferred payment data, the applet of the eSE 2026 or the SIM 2025 may produce data to be delivered to the NFC reader 203 and transfer the same through the RF gate to the NFC chip 2024. When the AP 2021 receives the payment data, the payment data may be delivered via the routing module in the AP 2021 to the determined HCE application. The HCE application may generate data to be delivered to the NFC reader 203, corresponding to the received payment data, and transfer the same to the NFC chip 2024. The NFC chip 2024 may transmit the received data to the NFC reader 203. After performing such a series of data communications with the NFC reader 203, the mobile electronic device 202 may complete the mobile payment In operation 510, according to an embodiment, the electronic device 201 may produce an RF parameter. The RF parameter may contain at least one of the following: whether the protocol parameter selection (PPS) is supported, whether the card identity (CID) is supported, or the SFGI. For example, the electronic device 201 may initialize the RF parameter by creating a setting not to support the PPS and the CID and setting the SFGI to 0. Such a setting may be made as to be able not to support the PPS so that the proximity coupling device (PCD) may exchange APDUs without transmitting or receiving the protocol and parameter selection (PPS) after the electronic device 201 receives the answer to select (ATS). Under the assumption that the first external electronic device 203 simultaneously performs data communication (e.g., transactions) with multiple electronic devices, the setting may be made not to support the CID. The SFGI used for the first external electronic device 203 to define the SFGT may be set to 0. The SFGT may indicate a special guard time for the PICC having sent the ATS to prepare for the reception of a next frame, and the SFGI may be a value ranging from 0 to 14. When the SFGI is 0, this may mean that the SFGT is unnecessary.

In operation 520, the electronic device 201 may update the RF parameter in the first communication circuit (e.g., the NFC chip 2014 of FIG. 3). For example, the electronic device 201 may set the RF parameter in the NFC chip via a proprietary NFC controller interface (NCI) instruction. The proprietary NCI instruction may be an instruction newly designated to fit the NCI instruction format for a new function that is not defined in the NCI specifications. The electronic device 201 may control the ISO 14443-4 protocol connection between the mobile electronic device 202 and the NFC reader 203 using the RF parameter updated in the NFC chip. According to an embodiment, the electronic device 201 may use the RF parameter generated for the ISO 14443-4 protocol protocol connection so that the mobile electronic device 202 may perform transactions with the NFC reader 203. The electronic device 201 may eliminate unnecessary operations upon the ISO 14443-4 protocol protocol connection between the NFC reader 203 and the mobile electronic device 202 using the initialized RF parameter.

Figure 6:
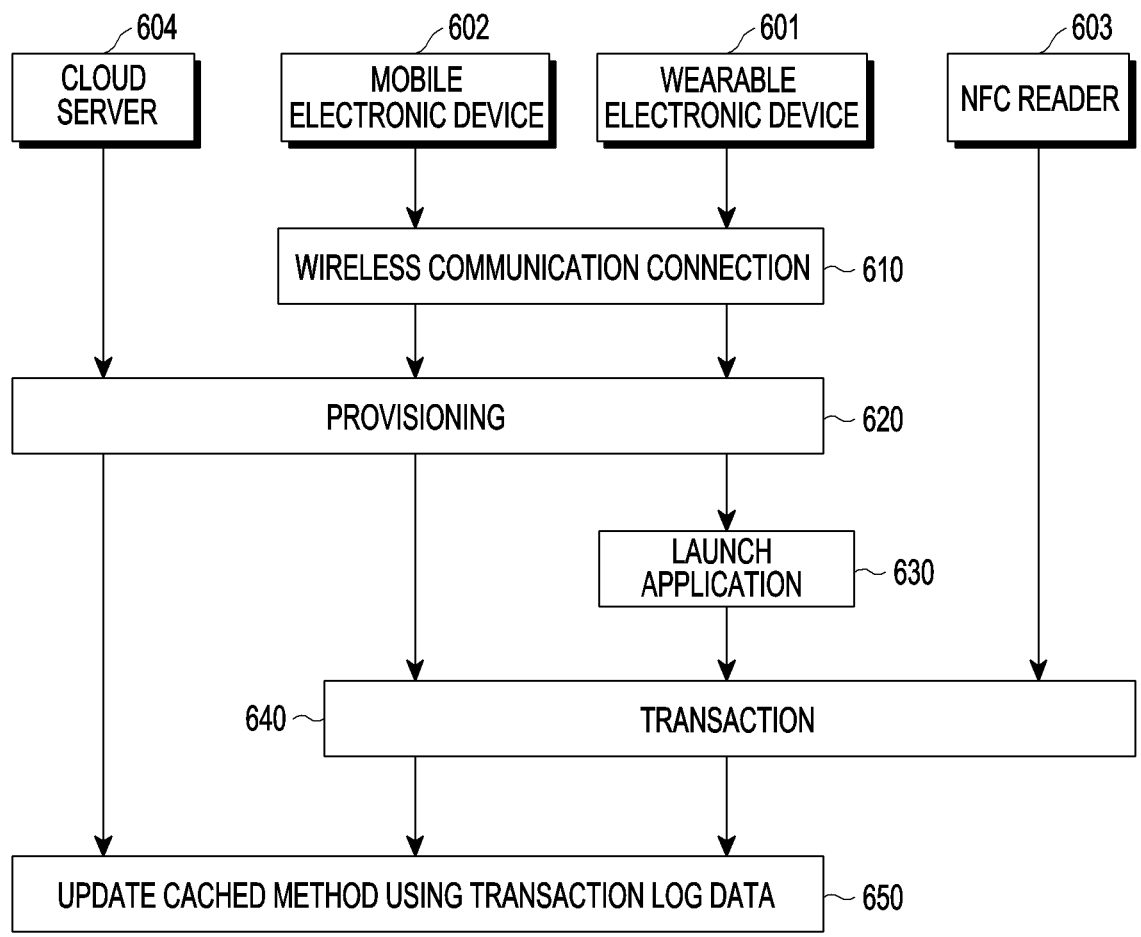
FIG. 6 is a concept view illustrating a method for controlling, by an electronic device, transactions of other electronic devices according to an embodiment.

FIG. 6 is a signal flow diagram for controlling, by an electronic device, transactions of other electronic devices according to an embodiment. According to an embodiment, an electronic device (e.g., the electronic device 101 of FIG. 1 or the electronic device 201 of FIG. 2) may be a wearable electronic device 601, and another electronic device (e.g., the first external electronic device 203 of FIG. 2 or the second external electronic device 202 of FIG. 2) may be a mobile electronic device 602 or an NFC reader 603. For example, the wearable electronic device 601 may control the transaction between the mobile electronic device 602 and the NFC reader 603.

In operation 610, the wearable electronic device 601 may be connected with the mobile electronic device 602 via wireless communication. For example, the wearable electronic device 601 may be connected with the mobile electronic device 602 via Bluetooth pairing.

In operation 620, the wearable electronic device 601 may perform provisioning for the transaction between the mobile electronic device 602 and the NFC reader by downloading a cached method that was previously uploaded to a cloud server 604 (e.g., the server 108 of FIG. 1) by the mobile electronic device 602 or another electronic device (not shown). The mobile electronic device 602 may perform the provisioning for the transaction with the NFC reader via the wearable electronic device 601 by downloading the cached method previously uploaded onto the cloud server 604. The cloud server 604 may have the cached method for transactions by the NFC reader, the wearable electronic device 601, and the mobile electronic device 602 previously uploaded, thereby providing the provisioning for the wearable electronic device 601 and the mobile electronic device 602. For example, the mobile electronic device 602 may receive, through a user interface, a selection of at least one application to perform transactions with the NFC reader 603 via the wearable electronic device 601. The at least one application selected may include an application ID (AID), and the mobile electronic device 602 may generate an AID list for the at least one application selected. The secure element (e.g., the eSE 2026 of FIG. 3 or the SIM 2025 of FIG. 3) for the at least one application selected may contain information about the RF parameter used upon the NFC contactless connection with the NFC reader 603. The mobile electronic device 602 may have a request for the RF parameter information contained in the secure element for at least one application selected sent to the NFC chip (e.g., the NFC chip 2024 of FIG. 3). The mobile electronic device 602 may generate representative RF parameter information for the RF parameter information received from the NFC chip. The mobile electronic device 602 may transmit the AID list and the representative RF parameter information to the wearable electronic device 601 via the wireless communication established in operation 610.

The mobile electronic device 602 may search for a cached method matching the at least one application selected. For example, the mobile electronic device 602 may send a request for a cached method matching the at least one selected application to the cloud server 604, and where the cloud server 604 has the matching cached method uploaded, the mobile electronic device 602 may download the cached method from the cloud server 604. According to an embodiment, the mobile electronic device 602 may match a default cached method to the at least one selected application. The mobile electronic device 602 may transmit the cached method matching the at least one selected application to the wearable electronic device 601.

According to an embodiment, the wearable electronic device 601 may receive, from the mobile electronic device 602, the AID list for the at least one application and the cached method for the at least one application. According to an embodiment, the wearable electronic device 601 may receive the AID list for the at least one application from the mobile electronic device 602 and send a request for the cached method for the application included in the AID list to the cloud server 604 and download the cached method from the cloud server 604.

In operation 630, according to an embodiment, the wearable electronic device 601 may launch an NFC application among the at least one application. The wearable electronic device 601 may update the routing table contained in the NFC chip (e.g., the NFC chip 2014 of the electronic device 201 of FIG. 3) of the wearable electronic device 601. The wearable electronic device 601 may include all the AIDs of the at least one application in the routing table, and upon receiving an instruction related to a particular AID from the NFC reader 603, the wearable electronic device 601 may transfer the received instruction to the NFC application. The wearable electronic device 601, after completing the update of the routing table, may update the RF parameter. For example, the wearable electronic device 601 may transmit the RF parameter (e.g., the representative RF parameter received from the mobile electronic device 602 or the RF parameter generated by the wearable electronic device 601) to the NFC chip. The wearable electronic device 601 may control the transaction between the mobile electronic device 602 and the NFC reader 603 using the RF parameter contained in the NFC chip.

In operation 640, the mobile electronic device 602 may perform transactions with the NFC reader 603 via the wearable electronic device 601. For example, the mobile electronic device 602 may provide an NFC service for fare payment, and the wearable electronic device 601 may communicate with the NFC reader 603 and receive data from the wearable electronic device 601 to indirectly communicate with the NFC reader 603.

In operation 650, the mobile electronic device 602 may update the cached method for the application using the after-transaction log data. As transaction log data accrues, such a cached method may be produced that may minimize the time delay. The mobile electronic device 602 may transmit the updated cached method along with the application information to the cloud server 604 and the wearable electronic device 601 and share the same with the cloud server 604 and the wearable electronic device 601. According to an embodiment, the cloud server 604 may update with the optimal cached method by cumulatively updating the cached methods for the application from various electronic devices. The optimized cached method may be downloaded to another electronic device, and thus, a cached method learned based on other user experiences may be applied. This process is the same as that described above in connection with operation 620.

Figure 7:
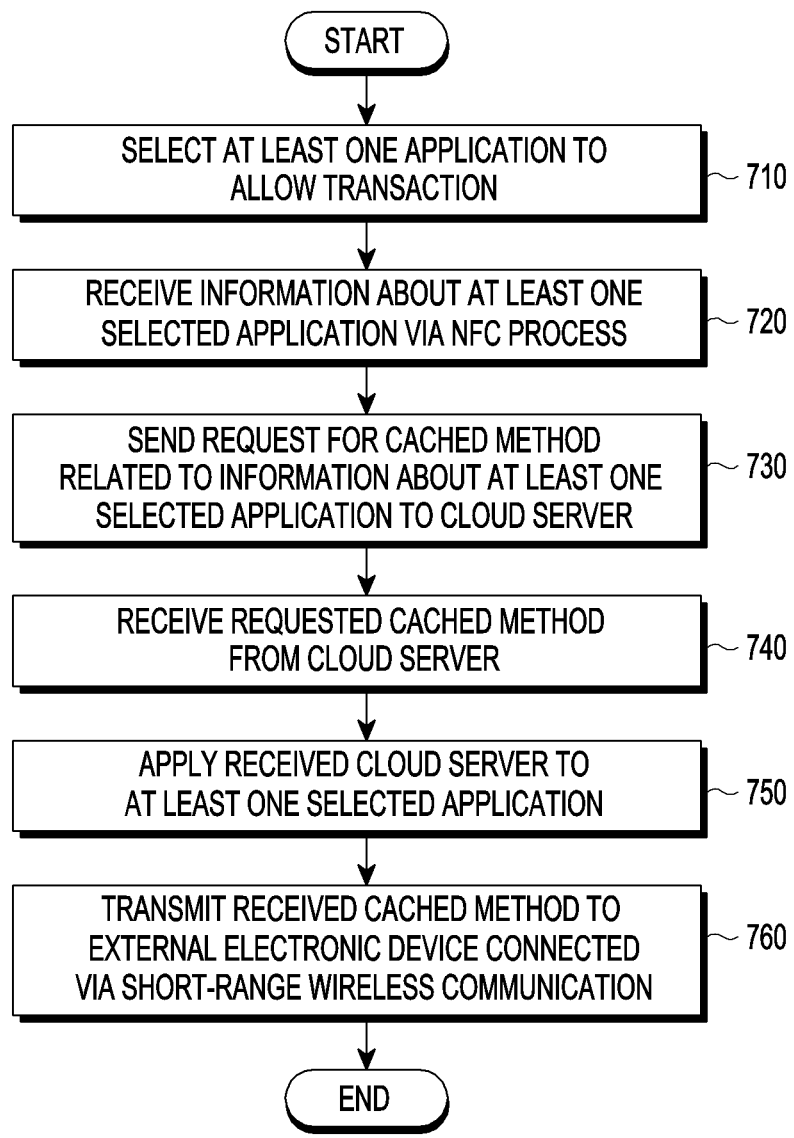
FIG. 7 is a flowchart illustrating a method for provisioning in a mobile electronic device according to an embodiment.

FIG. 7 is a flowchart illustrating a method for provisioning in a mobile electronic device according to an embodiment.

In operation 710, according to an embodiment, a mobile electronic device (e.g., the electronic device 101 of FIG. 1 or the electronic device 202 of FIG. 2) may select at least one application to allow transactions using another electronic device (e.g., the electronic device 201 of FIG. 2). For example, the mobile electronic device 202 may display a list of all NFC transaction supported applications installed on the mobile electronic device 202. Upon receiving an input to select at least one from the application list displayed through a user interface, the mobile electronic device 202 may select at least one application. Each application may include one or more applets and each applet may be identified with an AID. The mobile electronic device 202 may store information to allow transactions per AID of at least one application selected.

In operation 720, the mobile electronic device 202 may receive information about the at least one selected application via the NFC process. For example, the mobile electronic device 202 may identify the application information containing the application name, AID list, or secure element (SE) (e.g., the eSE 2026 or SIM 2025 of the electronic device 202 of FIG. 3).

In operation 730, the mobile electronic device 202 may send a request for a cached method matching the information about the at least one selected application to the cloud server (e.g., the server 108 of FIG. 1). For example, the mobile electronic device 202 may transmit request data containing identification information about the mobile electronic device 202, identification information about the electronic device (e.g., the wearable electronic device 201) connected to the mobile electronic device 202 to control transactions, and application information to the cloud server 108. The application information may include the application name, AID list, or secure element. The cloud server 108 may receive the request from the mobile electronic device 202 and search for a cached method for the application matching the received application information. For example, the cloud server 108 may determine whether or not there is the matching cached method based on the priorities as shown in the following table.

TABLE 1

| priority | matching target |
|---|---|
| 1 (highest) | application information and wearable electronic device information |
| 2 (high) | application information |
| 3 (mid-high) | AID list and secure element among application information |
| 4 (mid) | name and AID list among application information |
| 5 (low) | AID list among application information |

As shown in Table 1, the cloud server 108 may search for the cached method matching in terms of the application name, AID list, secure element, and wearable electronic device information (e.g., the model name of the wearable electronic device) among the stored data. When the matching cached method is in the cloud server 108, the cloud server 108 may transmit the cached method for the application to the mobile electronic device 202.

In operation 740, the mobile electronic device 202 may receive the requested cached method from the cloud server 108. For example, the mobile electronic device 202 may receive a cached method containing the parameter information used in the prior transaction for the requested application.

In operation 750, the mobile electronic device 202 may apply the received cached method to the at least one selected application. For example, the cached method may be categorized into the types shown in Table 2 below.

TABLE 2 default cached method (shallow cached method)
deep cached method
smart cached method
ultimate speedup cached method
combination of the above methods The default cached method may include a method in which during the application transaction process, the wearable electronic device 201, rather than receiving data from the mobile electronic device 202, directly transmits stored data to the transaction target, i.e., the NFC reader (e.g., the electronic device 203 of FIG. 2). For example, when, after the ISO 14443-4 protocol operation, the applets of the NFC reader 203, and the mobile electronic device 202 exchange ISO 7816-based APDUs, e.g., where the NFC reader 203 sends the SELECT Explicit AID to the first command APDU (C-APDU), the wearable electronic device 201 may directly transmit the corresponding first response-APDU (R-APDU) to the NFC reader 203 without receiving the R-APDU from the mobile electronic device 202.

The deep cached method may be one extending from the default cached method and may include a method in which the wearable electronic device 201, without the need for receiving data from the mobile electronic device 202, directly transmits data to the NFC reader 203 using cache data previously stored in the wearable electronic device 201.

The smart cached method may be a slight variation to the default cached method or deep cached method and may include a method in which the wearable electronic device 201 previously modifies part of the cache data stored in the wearable electronic device 201 and directly transmits to the NFC reader 203. For example, since the R-APDU is a fixed value, or some value thereof is only varied in the case of READ RECOD & READ BINARY, the wearable electronic device 201 may create a correct R-APDU based on the prior transaction log. The wearable electronic device 201 may create and transmit the R-APDU to the NFC reader 203, thereby saving the time required to send a request to, and receive from, the mobile electronic device 202.

The ultimate speedup cached method may include a method in which, before receiving a request for data from the NFC reader 203, the wearable electronic device 201 sends a request for data to the mobile electronic device 202. When in the transaction process, the third C-APDU is an unchanged, fixed value, and the wearable electronic device 201, after exchanging the second C-APDU and R-APDU and before receiving the third C-APDU from the NFC reader 203, may send a request for the third C-APDU to the mobile electronic device 202. Accordingly, the wearable electronic device 201 may rapidly receive the third R-APDU from the mobile electronic device 202.

According to an embodiment, the above-described cached methods may be combined. The optimal cached method may differ from one application to another, and the cached method may be updated to be the optimal one as the application is cumulatively executed. The cached method applied to the mobile electronic device 202 may be uploaded to the cloud server, thereby accelerating the optimization through various electronic device experiences. Various embodiments of the cached method are described below in greater detail with reference to FIGS. 11 to 13.

In operation 760, the mobile electronic device 202 may transmit the received cached method to the wearable electronic device 201 connected via wireless communication. Accordingly, the cached method for the application allowing transactions via the wearable electronic device 201 may be shared by the mobile electronic device 202 and the wearable electronic device 201.

Figure 8:
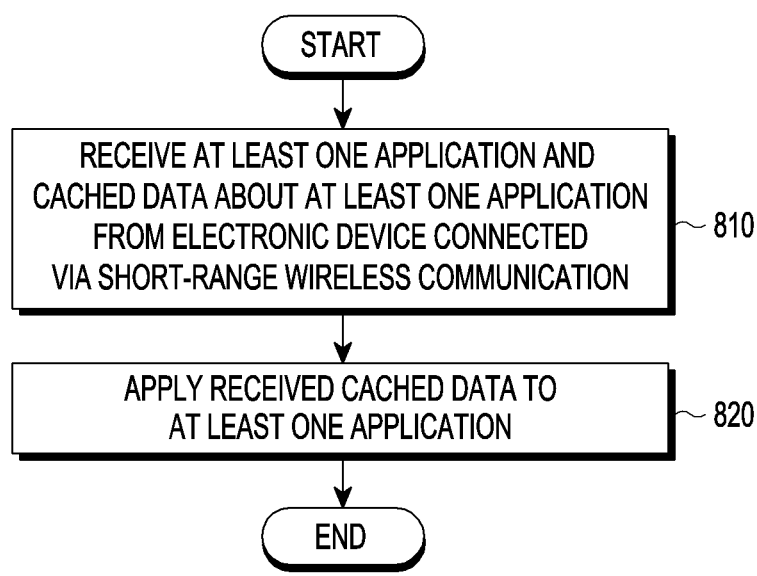
FIG. 8 is a flowchart illustrating a method for provisioning in a wearable electronic device according to an embodiment.

FIG. 8 is a flowchart illustrating a method for provisioning in a wearable electronic device according to an embodiment.

In operation 810, according to an embodiment, a wearable electronic device (e.g., the electronic device 201 of FIG. 2) may receive a cached method for at least one application from a mobile electronic device (e.g., the electronic device 202 of FIG. 2) connected via wireless communication. For example, the wearable electronic device 201 may receive application information including the application name, AID list, or secure element, as well as a cached method matching the application.

In operation 820, the wearable electronic device 201 may apply the received cached method to at least one corresponding application. For example, when the application is executed with the cached method previously stored in the wearable electronic device 201, the wearable electronic device 201 may control the mobile electronic device 202 to perform transactions with another electronic device using the stored cached method data.

Figure 9:
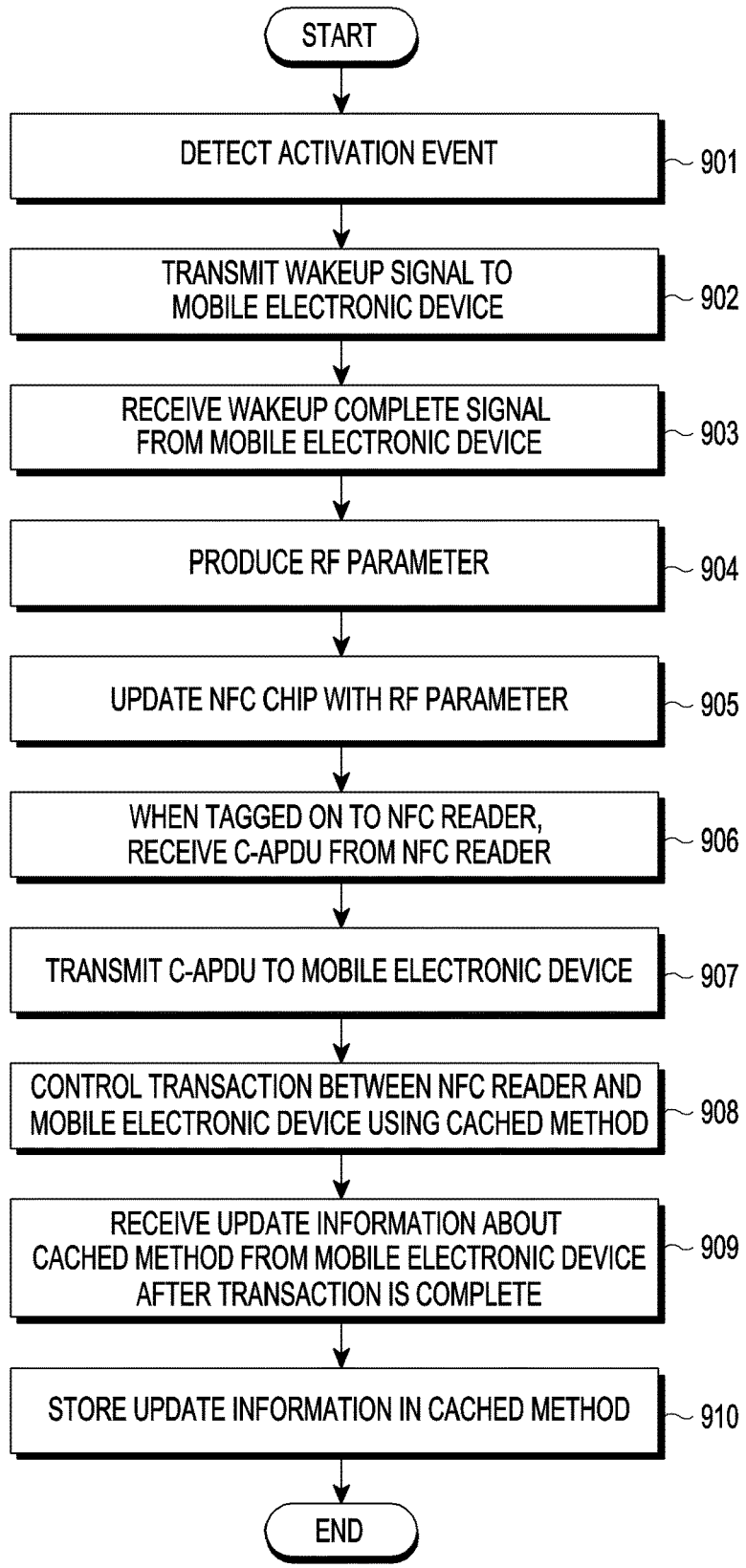
FIG. 9 is a concept view illustrating a method for controlling, by a wearable electronic device, transactions of other electronic devices according to an embodiment.

FIG. 9 is a concept view illustrating a method for controlling, by a wearable electronic device, transactions of other electronic devices according to an embodiment.

In operation 901, according to an embodiment, a wearable electronic device (e.g., the electronic device 201 of FIG. 2) may detect an activation event occurring. For example, the activation event may be a touch input to a touchscreen of the wearable electronic device 201 by the user. The wearable electronic device 201 may be tagged onto an NFC reader (e.g., the electronic device 203 of FIG. 2), receive a signal from the NFC reader 203 and detect the NFC event. The touch input may be an input to execute an application including the transaction using the NFC.

In operation 902, the wearable electronic device 201 may transmit a wakeup signal to a mobile electronic device (e.g., the mobile electronic device 202 of FIG. 2) connected via wireless communication. The wakeup signal may contain an NFC field activation event, application version information about the wearable electronic device 201, the serial number of the wearable electronic device 201, and/or session key information about the next transaction.

In operation 903, the wearable electronic device 201 may receive a wakeup complete signal from the mobile electronic device 202. The mobile electronic device 202 may receive the wakeup signal, activating at least one processor included in the mobile electronic device 202. The mobile electronic device 202, when the activation of the at least one processor is complete, may transmit a wakeup complete signal to the wearable electronic device 201.

In operation 904, the wearable electronic device 201 may generate an RF parameter, using, for example, the method shown in FIG. 5, 510.

In operation 905, the wearable electronic device 201 may update with the generated RF parameter in the NFC chip of the wearable electronic device 201. For operations 905, e.g., the method in connection with FIG. 5, 520, may apply.

In operation 906, when the wearable electronic device 201 is tagged onto the NFC reader 203, the wearable electronic device 201 may receive a C-APDU from the NFC reader 203. The C-APDU may be a request for the NFC reader 203 to perform data communication with the applet of the mobile electronic device 202, and the wearable electronic device 201 may transmit the same to the mobile electronic device 202.

In operation 907, the wearable electronic device 201 may transmit the received C-APDU to the mobile electronic device 202. The mobile electronic device 202 may start a transaction with the NFC reader 203 via the wearable electronic device as per the received C-APDU.

In operation 908, the wearable electronic device 201 may control the transaction between the NFC reader 203 and the mobile electronic device 202 using the cached method stored in the wearable electronic device 201. The wearable electronic device 201 may identify the "SELECT AID" contained in the C-APDU received from the NFC reader 203 and may apply the cached method corresponding to the application. For example, the wearable electronic device 201 may identify whether or not there is a cached method matching the C-APDU. When the wearable electronic device 201 has a matching cached method, and the cached value is available, the wearable electronic device 201 may directly transmit the cached data to the NFC reader 203. When the wearable electronic device 201 has a matching cached method, but the cached value is unavailable, the wearable electronic device 201 may send a request for necessary data to the mobile electronic device 202 and transfer the data to the NFC reader 203. The transferred data may be used for the next transaction. Unless the wearable electronic device 201 has a matching cached method, the wearable electronic device 201 may send a request for data to the mobile electronic device 202, receive the data, and transfer the data to the NFC reader 203. The wearable electronic device 201 may go through the above multiple operations, controlling the transaction between the mobile electronic device 202 and the NFC reader 203.

In operation 909, the wearable electronic device 201, after the transaction between the NFC reader 203 and the mobile electronic device 202 is complete, may receive update information about the cached method from the mobile electronic device 202. By using the log data for the complete transaction, the mobile electronic device 202 may further optimize the cached method, thereby reducing the overall transaction time.

In operation 910, the wearable electronic device 201 may store the received update information and update the cached method. The wearable electronic device 201 may apply the updated cached method to the next transaction.

Figure 10:
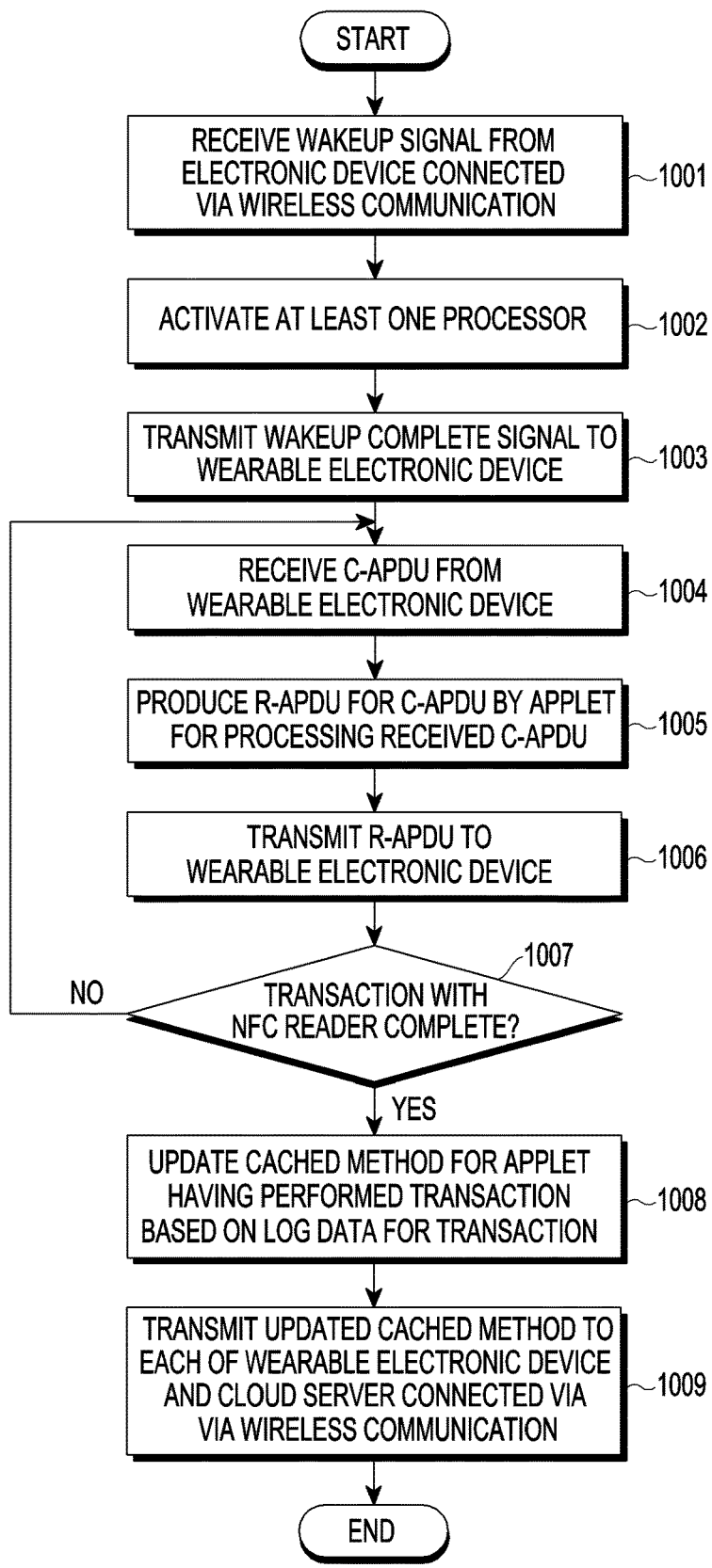
FIG. 10 is a flowchart illustrating a method for performing a transaction, by a mobile electronic device, using another electronic device according to an embodiment.

FIG. 10 is a flowchart illustrating a method for performing a transaction, by a mobile electronic device, using another electronic device according to an embodiment.

In operation 1001, a mobile electronic device (e.g., the electronic device 202 of FIG. 2) may receive a wakeup signal from a wearable electronic device (e.g., the electronic device 201 of FIG. 2) connected via wireless communication.

In operation 1002, the mobile electronic device 202 may activate at least one processor (e.g., the AP 2021 or CP 2022 of FIG. 2) using the wakeup signal. For example, the mobile electronic device 202 may be in sleep mode or sniff mode and may turn the processor from sleep mode or sniff mode into the active mode using the wakeup signal.

In operation 1003, the mobile electronic device 202 may transmit a wakeup complete signal to the wearable electronic device 201. The wakeup complete signal may include a response (e.g., ACK data) to the wakeup signal, identification information (e.g., serial number) about the mobile electronic device 202, and transaction information (e.g., session key).

In operation 1004, the mobile electronic device 202 may receive a C-APDU from the wearable electronic device 201. The C-APDU may be the one that the wearable electronic device 201 has received from the NFC reader (e.g., the electronic device 203 of FIG. 2).

In operation 1005, the mobile electronic device 202 may produce an R-APDU for the C-APDU in the applet to process the received C-APDU. The mobile electronic device 202 may identify the applet to process the C-APDU using the routing table, transfer the C-APDU to the applet, and allow the applet to produce the R-APDU.

In operation 1006, the mobile electronic device 202 may transmit the R-APDU to the wearable electronic device 201.

In operation 1007, the mobile electronic device 202 may determine whether or not the transaction with the NFC reader is complete. While the transaction is incomplete, the mobile electronic device 202 may repeat operations 1004 to 1006.

In operation 1008, the mobile electronic device 202, after the transaction is complete, may update the cached method for the applet that has performed the transaction based on the log data for the transaction. For example, based on a difference between the cached method and the transaction log data, the wearable electronic device 201 may not be required to send a request for data to the mobile electronic device 202 or may store data, which it may produce on its own, as a constant or as a variable to directly produce.

In operation 1009, the mobile electronic device 202 may transmit the updated cached method to each of the wearable electronic device 201 and the cloud server (e.g., the server 108 of FIG. 1) connected via wireless communication. The mobile electronic device 202 may connect to the cloud server 108 via remote wireless communication and connect to the wearable electronic device 201 via short-range wireless communication.

Figure 11:
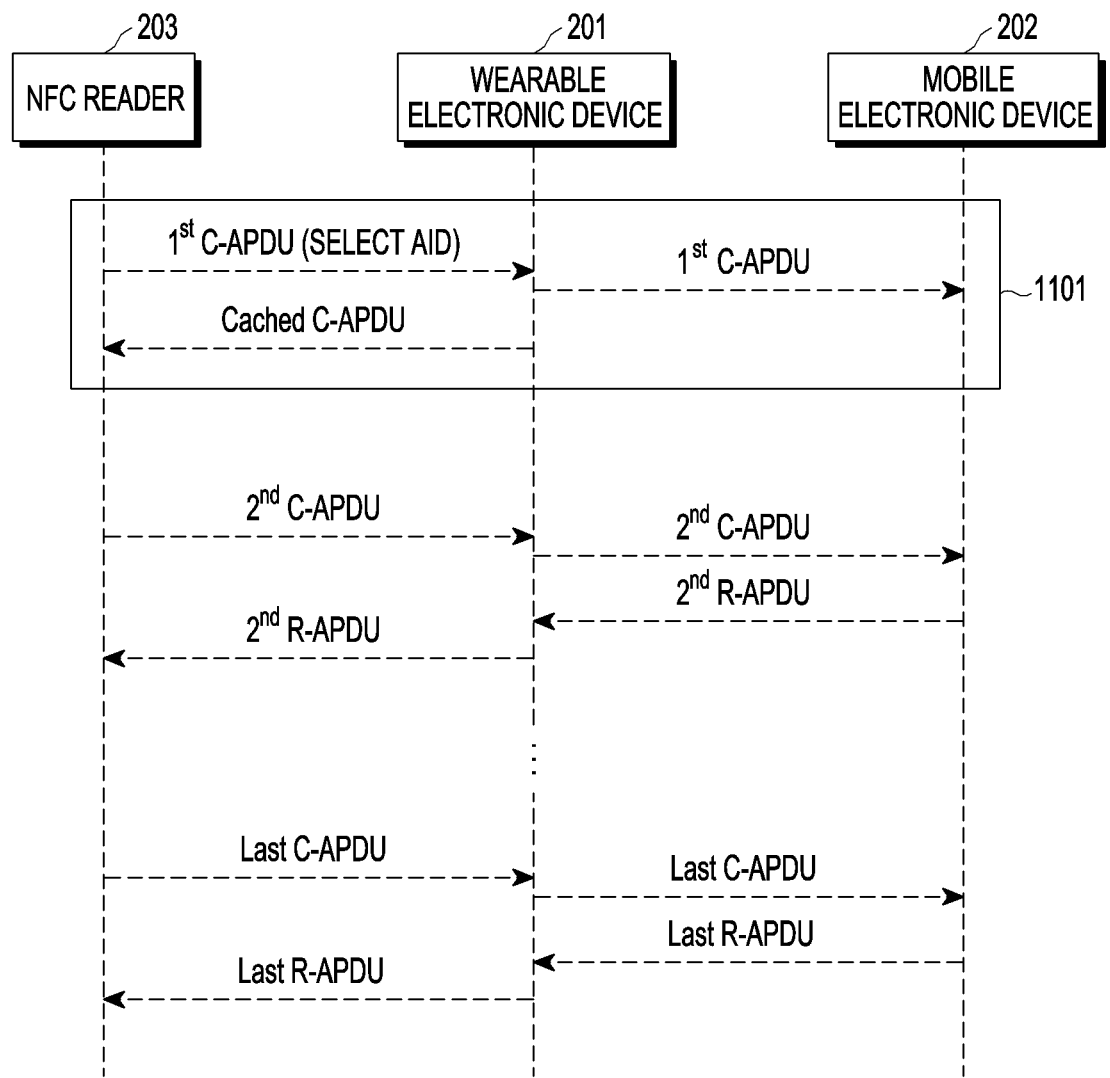
FIG. 11, FIG. 12, and FIG. 13 are sequence diagrams illustrating various cached methods for controlling, by an electronic device, transactions of other electronic devices according to an embodiment.
Figure 12:
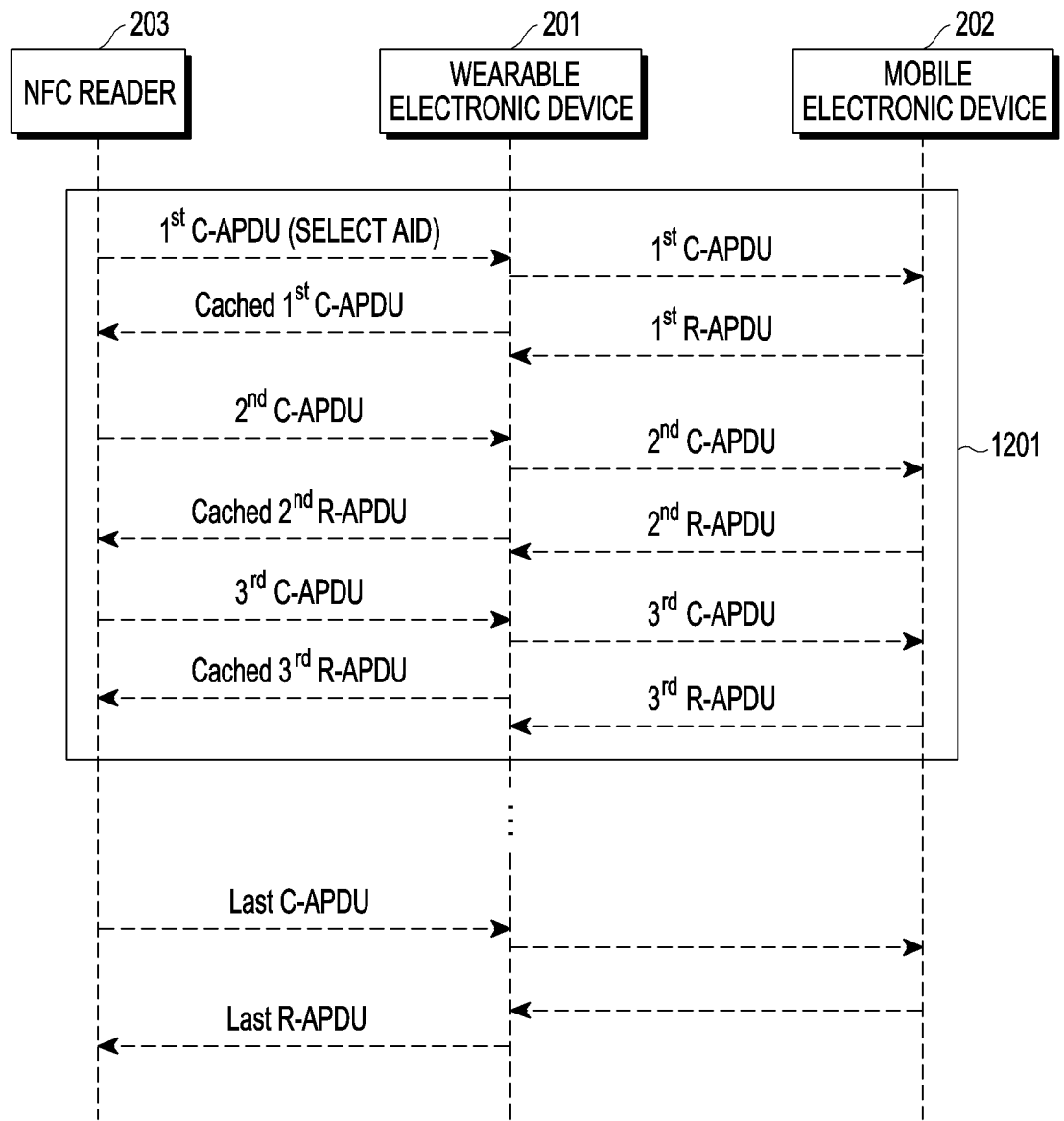
Figure 13:
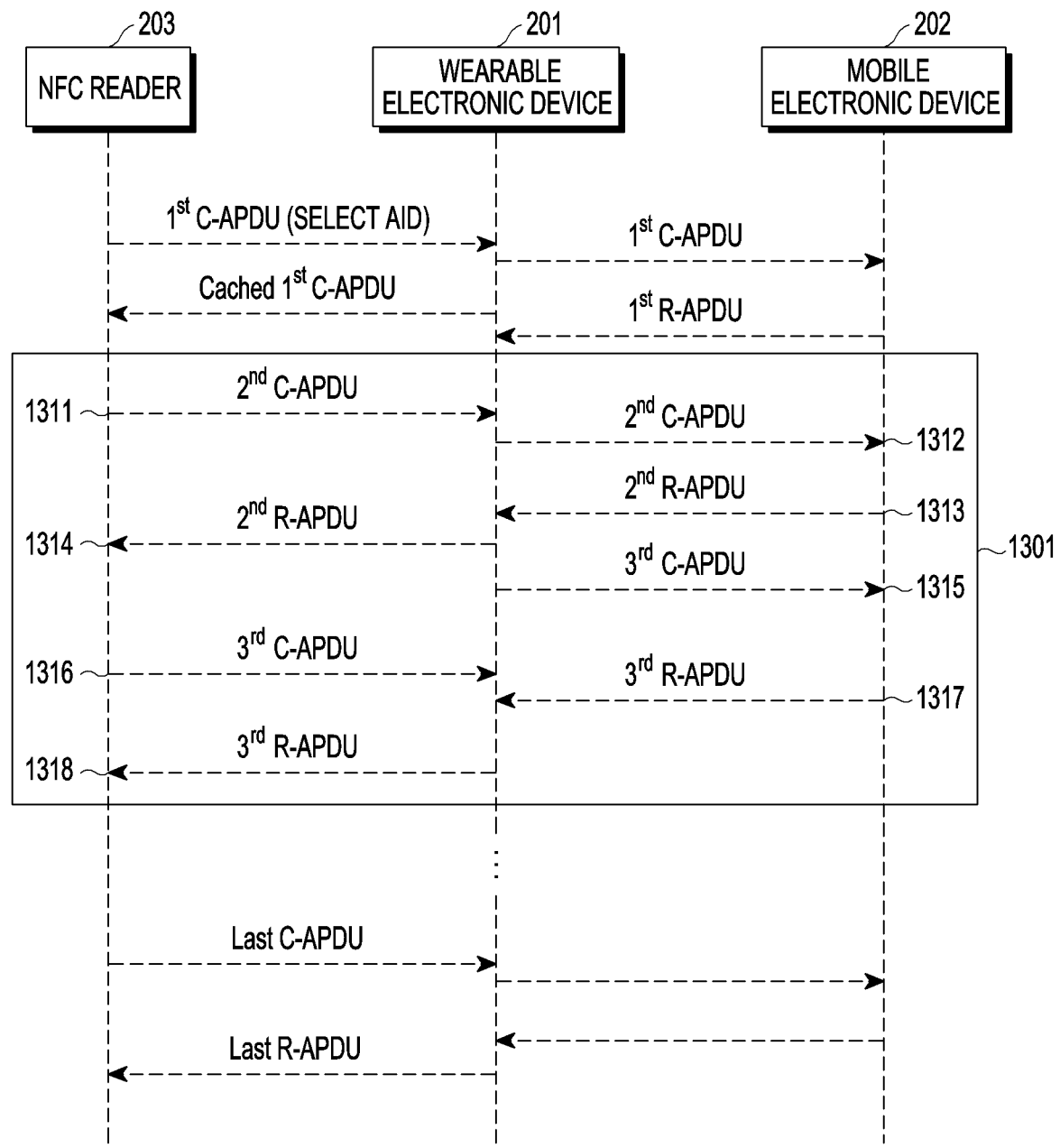

FIGS. 11 to 13 are sequence diagrams illustrating a cached method for controlling, by an electronic device, transactions of other electronic devices according to various embodiments. According to an embodiment, an electronic device may be, e.g., a wearable electronic device 201, and other electronic devices may be a mobile electronic device 202 and an NFC reader 203. The NFC reader 203 may communicate a plurality of APDUs while performing a transaction with the mobile electronic device 202. For example, the wearable electronic device 201 may transfer the second C-APDU received from the NFC reader 203 to the mobile electronic device 202 and transfer the R-APDU received from the mobile electronic device 202 to the NFC reader 203, thereby controlling the transaction.

FIG. 11 is a sequence diagram illustrating a method for controlling, by the wearable electronic device 201, the first APDU of the transaction.

In operation 1101, the wearable electronic device 201 may directly transmit the stored R-APDU to the NFC reader 203 using the cached method without the need for sending a request for R-APDU to the mobile electronic device 202. For example, the first C-APDU of the transaction may contain "SELECT AID," the matching cached method may be identified, and when the first R-APDU is a constant, the stored R-APDU may be transmitted to the NFC reader 203. The cached method of FIG. 11 may be the default cached method described above in connection with Table 2.

FIG. 12 is a sequence diagram illustrating a method for controlling, by the wearable electronic device, one or more APDUs of the transaction.

In operation 1201, the wearable electronic device 201 may directly transmit the cached data to the NFC reader 203 using the cached method, regardless of whether or not it has received the R-APDU from the mobile electronic device 202, corresponding to the first, second, and third C-APDUs. Accordingly, the time delay required to receive the R-APDU from the mobile electronic device 202 and transfer the R-APDU may be avoided.

According to an embodiment, the cached method may be applied to continuous APDUs, as in operation 1201, or to discontinuous APDUs. For example, the wearable electronic device 201 may transmit the stored R-APDUs to the NFC reader 203 without the need to receive the R-APDUs corresponding to the first, second, and third C-APDUs from the mobile electronic device 202. When the order of the APDUs contained in the transaction may be fixed, and the R-APDUs are stored as constants in the cached method, this may be put to use. The cached method of FIG. 12 may be the deep cached method described above in connection with Table 2.

According to an embodiment, when the R-APDU is associated with the prior R-APDU, the following cached method may apply. Table 3 below shows example R-APDUs in the first transaction and the second transaction.

In operation 1312, the wearable electronic device 201 may transmit the received second C-APDU to the mobile electronic device 202.

In operation 1313, the wearable electronic device 201 may receive the second R-APDU corresponding to the second C-APDU from the mobile electronic device 202.

In operation 1314, the wearable electronic device 201 may transmit the received second R-APDU to the NFC reader 203.

After the second APDU is exchanged between the mobile electronic device 202 and the NFC reader 203 and before receiving the third C-APDU from the NFC reader 203, the wearable electronic device 201 may send a request for the third C-APDU to the mobile electronic device 202 and may quickly receive the third R-APDU from the mobile electronic device 202. In operation 1315, the wearable electronic device 201, before receiving the third C-APDU from the NFC reader 203, may transmit the third C-APDU to the mobile electronic device 202.

In operation 1316, the wearable electronic device 201 may receive the third C-APDU from the NFC reader 203. The wearable electronic device 201, because it has already transferred the third C-APDU to the mobile electronic device 202 in operation 1315, need not transmit the third C-APDU to the mobile electronic device 202 in response to the reception of the third C-APDU.

In operation 1317, the wearable electronic device 201 may receive the third R-APDU corresponding to the third C-APDU from the mobile electronic device 202. Since the wearable electronic device 201 has sent a request for the third C-APDU to the mobile electronic device 202 earlier than the time of reception of the third C-APDU from the NFC reader 203, at least, the time period from the time when the wearable electronic device 201 sends the request for the

TABLE 3

| order of APDU | first transaction | second transaction |
| --- | --- | --- |
| ... | ... | ... |
| third APDU | ->01b201241a<br><-012c000014ce00000b27000000<br>00072008002037436100081a19000 | ->01b201241a<br><-012c000014ce00000b28000000<br>00072008002037436100081a29000 |
| fourth APDU | ->01b202241a<br><-012c000014ce00000b26000000<br>00072008002037436100081a09000 | ->01b201241a<br><-012c000014ce00000b27000000<br>00072008002037436100081a19000 |
| ... | | |
| seventh APDU | ->01b201241a<br><-012c000014ce00000b28000000<br>00072008002037436100081a29000 | ->01b201241a<br><-012c000014ce00000b29000000<br>00072008002037436100081a39000 |

The R-APDUs for the fourth C-APDU ("01b202241a") and the seventh C-APDU ("01b202241a") may be produced by adding 1 to the relevant bit based on the third R-APDU ("01b201241a"). According to ISO 7816-4, there are some types of APDUs related to record or binary. For example, in the case of READ RECOD & READ BINARY, the R-APDU is fixed or only part thereof is varied, as shown in Table 3. The cached method, as shown in Table 3, may be the smart cached method shown in Table 2.

FIG. 13 is a sequence diagram illustrating a method for controlling a transaction in a cached method in which the wearable electronic device 201, before receiving a C-APDU from the NFC reader 203, sends a request for C-APDU to the mobile electronic device 202.

For example, operations denoted with 1301 are described.

In operation 1311, the wearable electronic device 201 may receive the second C-APDU from the NFC reader 203.

third C-APDU to the mobile electronic device 202 (the time when operation 1315 is performed) to the time when it receives the third C-APDU from the NFC reader 203 (the time when operation 1316 is performed) may be saved. Unlike in FIG. 13, the wearable electronic device 201 may receive the third R-APDU from the mobile electronic device 202 before receiving the third C-APDU from the NFC reader 203. When the wearable electronic device 201 receives the third R-APDU earlier than the third C-APDU, at least, the time period from the time when the wearable electronic device 201 previously sent a request for the third C-APDU to the mobile electronic device 202 to the time when it receives the third R-APDU from the mobile electronic device 202 may be saved.

In operation 1318, the wearable electronic device 201 may transmit the received third R-APDU to the NFC reader 203.

According to an embodiment, where the C-APDU is a constant and the R-APDU is a random variable (e.g., GET CHALLENGE command in ISO 7816-4), the wearable electronic device 201 needs to send a request for R-APDU to, and receive from, the mobile electronic device 202 to transfer a correct R-APDU to the NFC reader 203. The wearable electronic device 201 cannot cache the third R-APDU. However, as in operation 1301, the wearable electronic device 201 may transmit the cached C-APDU to the mobile electronic device 202 before receiving the third C-APDU from the NFC reader 203. This may reduce the transaction time compared to receiving the third C-APDU from the NFC reader 203 and then transferring the C-APDU to the mobile electronic device 202.

According to an embodiment, upon applying the cached method described above in connection with FIGS. 11 to 13, the wearable electronic device 201 may eliminate the time taken to analyze and receive the APDU for the transaction, and the overall time for the transaction performed by the mobile electronic device 202 and the NFC reader 203 via the wearable electronic device may be reduced.

According to an embodiment, there may be provided a computer-readable recording medium storing instructions configured to perform at least one operation by at least one processor, the at least one operation comprising of establishing, by the at least one processor, a wireless communication channel with a second external electronic device, receiving, by the second external electronic device, first data about an application configured to perform a transaction between the second external electronic device and a first external electronic device from a server, controlling the transaction between the second external electronic device and the first external electronic device based on the first data, after the transaction is complete, receiving update information for the first data from the second external electronic device through the wireless communication channel, and updating the first data based on the received update information.

According to an embodiment, the first data may include a plurality of APDUs for the transaction between the second external electronic device and the first external electronic device, wherein controlling the transaction between the second external electronic device and the first external electronic device may include, upon receiving a request for a first APDU among the plurality of APDUs from the first external electronic device, transmitting a first APDU response included in the first data to the first external electronic device, receiving a request for a second APDU among the plurality of APDUs from the first external electronic device, transmitting the second APDU request to the second external electronic device, and transmitting a second APDU response received from the second external electronic device to the first external electronic device.

According to an embodiment, the computer-readable recording medium may further comprise, upon detecting user input to execute the application or receive a signal from the first external electronic device, triggering to transmit a wakeup signal to the second external electronic device.

According to an embodiment, the computer-readable recording medium may further comprise of producing an RF parameter including information regarding at least one of whether a PPS is supported, whether a CID is supported, or an SFGI, and of transmitting the RF parameter to the first external electronic device.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, or hardware programmed with software, and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as a machine (e.g., computer)-readable storage medium (e.g., an internal memory device 136) or an external memory 138 storing software (e.g., the program 240) containing commands. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to an embodiment, a mobile electronic device may quickly perform data communication with an NFC reader through a wearable electronic device.

According to an embodiment, the wearable electronic device may previously activate the mobile electronic device to allow the mobile electronic device, in a sleep mode or sniff mode, to perform a transaction with the NFC reader without any time delay.

According to an embodiment, the wearable electronic device may eliminate the time delay by directly transmitting, to the NFC reader, some data that need not be requested and received from the mobile electronic device in a transaction between the mobile electronic device and the NFC reader. According to an embodiment, the wearable electronic device may reduce a time delay that may occur upon data analysis in the transaction process and reception of data from the mobile electronic device by applying a cached method for the transaction between the mobile electronic device and the NFC reader.

According to an embodiment, the mobile electronic device may accumulate user experiences by learning the cached method based on log data about transactions with the NFC reader via the wearable electronic device and sharing the same with another electronic device via a cloud server.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
   a first communication circuit configured to support near-field communication (NFC);
   a second communication circuit configured to support wireless communication;
   at least one memory device; and
   at least one processor operationally connected with the first communication circuit, the second communication circuit, and the at least one memory device, wherein the at least one memory device stores instructions, when executed, cause the at least one processor to perform operations comprising:
   receive, from a first external electronic device via the first communication circuit, a first request for the first external electronic device to perform a transaction with a second external electronic device,
   in response to the first request:
   transmit the first request via the second communication circuit to the second external electronic device; and
   transmit a first response, corresponding to the first request, the first response including data stored in the at least one memory device, to the first external electronic device via the first communication circuit, and
   receive a second response corresponding to the first request from the second external electronic device via the second communication circuit, the second response containing at least part of the first response.

2. The electronic device of claim 1, wherein transmit the first response comprises modify at least part of an initial response based on the data stored in the at least one memory device and transmit the modified response as the first response to the first external electronic device.

3. The electronic device of claim 1, wherein to the operations further comprise:
   transmit a second request to the second external electronic device via the second communication circuit, based on the data stored in the at least one memory device,
   after transmitting the second request:
   receive a third request from the first external electronic device via the first communication circuit, the third request including at least part of the second request and corresponding to the first response,
   receive a third response corresponding to the second request from the second external electronic device via the second communication circuit, and
   transmit the third response to the first external electronic device via the first communication circuit.

4. The electronic device of claim 1, wherein the operations comprise:
   in response to an event detected by the first communication circuit, transmit a wakeup signal to the second external electronic device via the second communication circuit.

5. The electronic device of claim 1, wherein the operations further comprise:
   upon receiving a signal from the first external electronic device or detecting an input associated with the transaction through a user interface, determine that an event for the first communication circuit occurs.

6. The electronic device of claim 1, wherein the operations further comprise:
   produce a radio frequency (RF) parameter including information regarding at least one of whether a protocol parameter selection (PPS) is supported, whether a card identifier (CID) is supported, or a startup frame guard time integer (SFGI) and update the first communication circuit with the RF parameter.

7. The electronic device of claim 6, wherein the operations further comprise:
   initialize the RF parameter not to support the PPS, not to support the CID, and to set the SFGI to 0.

8. The electronic device of claim 1, wherein the operations further comprise:
   transmit the first response to the first external electronic device within a predetermined time of reception of the first request.

9. The electronic device of claim 1, wherein the data stored in the at least one memory device includes data received from a server via the second communication circuit.

* * * * *